United States Patent [19]

Alberts et al.

[11] Patent Number: 4,489,017

[45] Date of Patent: Dec. 18, 1984

[54] SPRAY DRYING OF MICROCAPSULE DISPERSIONS

[75] Inventors: Heinrich Alberts, Cologne; Manfred Dahm, Leverkusen; Gert Jabs, Odenthal; Christian Wegner, Cologne, all of Fed. Rep. of Germany

[73] Assignee: Bayer Aktiengesellschaft, Leverkusen, Fed. Rep. of Germany

[21] Appl. No.: 512,974

[22] Filed: Jul. 12, 1983

Related U.S. Application Data

[63] Continuation of Ser. No. 171,305, Jul. 23, 1980, abandoned.

[30] Foreign Application Priority Data

Jul. 26, 1979 [DE] Fed. Rep. of Germany ....... 2930409

[51] Int. Cl.$^3$ .............................................. B01J 13/02
[52] U.S. Cl. ..................................... 264/4.7; 252/194; 252/385; 428/402.21
[58] Field of Search ...................... 264/4.7; 428/402.21

[56] References Cited

U.S. PATENT DOCUMENTS

| | | | |
|---|---|---|---|
| 1,883,024 | 10/1932 | Smith | 252/194 |
| 2,033,934 | 3/1936 | Grebe et al. | 252/194 |
| 3,575,882 | 4/1971 | Vandegaer et al. | 264/4.7 |
| 3,796,669 | 3/1974 | Kiritani et al. | 264/4.7 X |
| 3,836,383 | 9/1974 | Kiritani et al. | 264/4.7 X |
| 3,954,678 | 5/1976 | Marquisee | 252/62.53 X |

*Primary Examiner*—Richard D. Lovering
*Attorney, Agent, or Firm*—Connolly and Hutz

[57] ABSTRACT

A process for spray drying aqueous suspensions of microcapsules having walls of polyurea which have been formed in known manner from polyisocyanate and polyamine by interface polyaddition, in which from 1 to 10 parts by weight, based on the microcapsules, of a water-soluble silicate and/or a water-soluble alkaline earth metal salt or hydroxide are added to the aqueous reaction mixture of polyisocyanate and polyamine.

10 Claims, No Drawings

SPRAY DRYING OF MICROCAPSULE DISPERSIONS

This is a continuation of application Ser. No. 171,305 filed July 23, 1980, now abandoned.

This invention relates to a process for spray drying aqueous dispersions containing microcapsules with polyurea walls (of polyisocyanate and polyamine) in the presence of dehydrating agents which are formed in situ during the process of polyaddition in which the walls of the capsules are formed.

The preparation of microcapsule dispersions is known, especially for the production of reaction copying paper (see M. Gutcho, Capsule Technology and Microencapsulation, Noyes Data Corporation, 1972, pages 242 to 277; G. Baxter in Microencapsulation, Processes and Applications, published by J. E. Vandegaer, Plenum Press, New York, London, pages 127 to 143). Methods of spray drying these dispersions are also mentioned in the above literature.

Microcapsule dispersions in which the walls of the capsules consist of polyureas obtained by isocyanateamine polyaddition are very difficult to dry. A continuously increasing deposit of agglomerated capsules forms during the process of spray drying, thereby reducing the yield.

The dried capsules also are not free from agglomerates and can no longer be redispersed sufficiently to form stable suspensions. They are therefore unusable for many applications.

It is also known that dehydrating agents can be added during spray drying of the dispersion, for example salt-type compounds which bind the residual water adhering to the particles. Glauber salt, chalk and silicates have been particularly mentioned for this purpose.

The dehydrating agents must consist of the most minute particles and must be distributed as homogeneously as possible in the aqueous dispersion. They are therefore difficult to use, and they do not completely prevent the agglomeration of capsules in which the walls consist of polyurea.

The present invention is based on the finding that inorganic dehydrating agents can be prepared in a particularly active form in situ during the polyaddition of polyisocyanate and polyamine. The progressive fall in pH and concomitant evolution of $CO_2$ occurring in the course of the polyaddition reaction are used to convert alkaline earth metal salts into insoluble carbonates, or silicates into insoluble polysilicates.

The invention provides a process for the preparation of microcapsules having walls of polyureas by employing the known method of enveloping a core by interface polyaddition of polyisocyanate and polyamine in aqueous emulsion and then drying the resulting suspension of microcapsules by spray drying, wherein from 1 to 10 parts by weight, based on the microcapsules, of a water-soluble silicate and/or a water-soluble alkaline earth metal salt or hydroxide are added to the aqueous emulsion. The microcapsules are thereby obtained after spray-drying in the form of freely flowing powders which are free from agglomerates, and at the same time foaming of the aqueous suspension of microcapsules is prevented during the reaction in which the walls of the capsules form.

The preparation of microcapsules by the polyisocyanate-polyamine addition process is known.

Suitable isocyanates for this process include, for example, diisocyanates such as xylylene-1,4-diisocyanate, xylylene-1,3-diisocyanate, trimethylene diisocyanate, hexamethylene diisocyanate, ethylidene diisocyanate, cyclohexylidene-1,2-diisocyanate, cyclohexylidene-1,4-diisocyanate, and polyisocyanate prepolymers, e.g. the addition product of hexamethylene diisocyanate and hexanetriol, the addition product of 2,4-tolylene diisocyanate and pyrocatechol, the addition product of tolylene diisocyanate and hexanetriol, the addition product of tolylene diisocyanate and trimethylol propane and the addition product of xylylene diisocyanate and trimethylolpropane.

Suitable modified aliphatic isocyanates include those based on hexamethylene-1,6-diisocyanate, m-xylylene diisocyanate, 4,4'-diisocyanato-dicyclohexylmethane and isophorone, which contain at least two functional isocyanate groups per molecule.

Polyisocyanates based on derivatives of hexamethylene-1,6-diisocyanate having a biuret structure are also suitable; their preparation has been described in German Auslegeschriften Nos. 1,101,394 and 1,543,178 and German Offenlegungsschriften Nos. 1,568,017 and 1,931,055.

The polyisocyanates may be additionally modified by a reaction with difunctional and trifunctional chain-lengthening agents, e.g. with water, polyhydric alcohols such as ethanediol, glycerol or trimethylolpropane, or carboxylic acids such as succinic acid, adipic acid or sebacic acid in proportions of from 0.01 to 0.5 mol per isocyanate equivalent.

Instead of or in addition to the isocyanate groups, the compounds may contain reactive groups such as carbodiimide, uretdione, uretoneimine, uretdione diimine, 4-iminooxazolidinone-(2), $\beta$-alkylene-propiolactone and cyclobutane dione-(1,3) groups.

Thus, for example, it is suitable for use polyisocyanatopolyuretone imines which may be obtained by the carbodiimidisation of hexamethylene-1,6-diisocyanate containing biuret groups with the aid of phosphoro-organic catalysts and subsequent conversion of the carbodiimide groups originally formed to uretoneimine groups by reaction with isocyanate groups. The resulting modified polyisocyanate may contain considerable proportions of oxidiazinetrione, triisocyanurate or symmetrical triazine dione imine as the structural elements, depending on the reaction conditions.

Diisocyanates corresponding to formula (I):

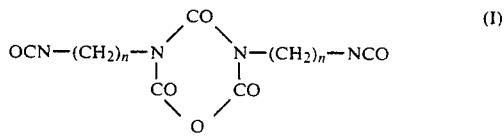

wherein $n=3$ to 6, are particularly suitable.

Aliphatic primary or secondary diamines such as the following are suitable: ethylenediamine-(1,2); bis-(3-aminopropyl)-amine; hydrazine; hydrazine ethanol-(2); bis-(2-methylaminoethyl)-methylamine; 1,4-diaminocyclohexane; 3-amino-1-methylaminopropane; N-hydroxy-ethylethylenediamine; N-methyl-bis-(3-aminopropyl)-amine; 1,4-diamino-n-butane; 1,6-diamino-n-hexane; ethylene-(1,2)-diamino-N-ethyl-sulphonic acid (as alkali metal salt), 1-aminoethylethylene diamine-(1,2), and bis-(N,N'-aminoethyl)-ethylenediamine-(1,2).

Hydrazine and its salts are also regarded as diamines in this context.

Examples of colour-forming agents which may be encapsulated include triphenyl-methane compounds, diphenylmethane compounds, xanthene compounds, thiazine compounds and spiropyrane compounds.

The following are particularly suitable: triphenyl methane compounds: 3,3-bis-(p-dimethylaminophenyl)-6-dimethylaminophthalide ("Crystal Violet Lactone", hereinafter referred to as "K.V.L.") and 3,3-bis-(p-dimethylaminophenyl)-phthalide ("Malachite Green Lactone"); diphenyl methane compounds: 4,4'-bis-dimethylaminobenhydrylbenzyl ether, N-halogenophenylleucolamine, N-β-naphthylleucolamine, N-2,4,5-trichlorophenylleucolamine and N-2,4-dichlorophenyl leucolamine; xanthene compounds: rhodamine-β-anilinolactam, rhodamine-β-(p-nitroaniline)-lactam, rhodamine-β-(p-chloroaniline)-lactam, 7-dimethylamine-2-methoxyfluoran, 7-diethylamine-3-methoxyfluoran, 7-diethylamine-3-methylfluoran, 7-diethylamine-3-chlorofluoran, 7-diethylamine-3-chloro-2-methylfluoran, 7-diethylamine-2,4-dimethylfluoran, 7-diethylamine-2,3-dimethylfluoran, 7-diethylamine-(3-acetylmethylamine)-fluoran, 7-diethylamine-3-methylfluoran, 3,7-diethylamine-fluoran, 7-diethylamine-3-(dibenzylamine)-fluoran, 7-diethylamine-3-(methylbenzylamine)-fluoran, 7-diethylamine-3-(chloroethylmethylamine)-fluoran, 7-diethylamine-3-(dichloroethylamine)-fluoran, and 7-diethylamine-3-(diethylamine)-fluoran; thiazine compounds; N-benzoyl-leucomethylene blue, o-chlorobenzoyl-leucomethylene blue and p-nitrobenzoyl-leucomethylene blue; spiro compounds: 3-methyl-2,2'-spiro-bis-(benzo(f)-chromene).

Solvents capable of dissolving these colour-forming agents include, for example, chlorinated diphenyl, chlorinated paraffin, cotton seed oil, ground nut oil, silicone oil, tricresyl phosphate, monochlorobenzene, partially hydrogenated terphenyls, alkylated diphenyls, alkylated naphthalenes, aryl ethers, aralkyl ethers, higher alkylated benzene and the like.

Diluents such as kerosene, n-paraffins or isoparaffins are frequently added to the solvents.

To prepare the microcapsules, the colour-forming agents and the isocyanate are first dissolved in the above-mentioned solvents and the resulting organic phase is emulsified in the continuous aqueous phase which may contain protective colloids and possibly also emulsifiers. An aqueous polyamine solution is added to the emulsion in a quantity which is stoichiometric to the polyisocyanate in the organic phase.

Protective colloids and emulsifying agents are added to the aqueous phase to assist emulsification and stabilization of the resulting emulsion. Examples of such substances acting as protective colloids include carboxymethyl cellulose, gelatine and polyvinyl alcohol. Examples of suitable emulsifiers include ethoxylated 3-benzylhydroxybiphenyl, and reaction products of nonylphenol with varying quantities of ethylene oxide and sorbitan fatty acid esters.

The microcapsules may be prepared continuously or batchwise, generally using dispersing apparatus which produce a high shearing gradient such as, for example, flat bladed paddle mixers, rotor cage mixers, high-speed stirrers, colloid mills, homogenizers, ultrasonic dispersers, nozzles, steel nozzles and supersonic machines. The most important factor in determining the diameter of the microcapsules obtained is the vigorousness of turbulence during mixing. Capsules measuring from 1 to 2000 μm may be obtained. Capsules having diameters of from 2 to 20 μm are preferred. The capsules do not agglomerate and they have a narrow range of particle sizes. The proportion by weight of the material of the core to the material of the envelope ranges from 50:90 to 50:10.

Salts or hydroxides of the alkaline earth metals, such as calcium chloride or calcium hydroxide, or silicates such as sodium silicate (waterglass) are added to the suspension after the addition of the diamine solution and are converted into the dehydrating agents in the subsequent course of the reaction forming the walls of the capsule.

The quantity of salt or hydroxide added is calculated so that all the carbon dioxide evolved during the subsequent reaction for forming the capsule walls is utilised to precipitate the carbonates. The quantity of carbon dioxide evolved depends on the nature of the isocyanate used and on the cross-linking agent and can be determined empirically.

The lowering of pH during the reaction can also be determined in a similar manner.

The quantity of sodium silicate to be added is calculated so that from 0.5 to 5% by wt. of the silicon dioxide, based on the quantity of capsules in the suspension, is precipitated. To complete the polyaddition reaction more rapidly, the suspension is heated to 60° C. with additives with stirring and then maintained at 60° C. at least for a further two hours.

The completely reacted dispersions may be dried by conventional methods in the usual spray drying apparatus. In the process according to the invention, the microcapsules are obtained in the form of a freely flowing powder which is free from agglomerate.

The invention is illustrated by the following Examples, in which the percentages are by weight:

EXAMPLE 1

11.22 g of benzoyl leucomethylene blue (NBL) and 33.66 g of crystal violet lactone (KVL) are dissolved in 780.1 g of diisopropyl naphthalene by heating to temperatures of not more than 95° C. with stirring, and 195 g of isohexadecane and 180 g of oxadiazine trione diisocyanate are added to this solution. This organic phase is introduced into 2250 g of a 0.5% aqueous solution of polyvinyl alcohol and emulsified with the aid of an ultrasonic whistle and adjusted to a droplet size of about 10 μm. A 5.5% amine solution consisting of 18.9 g of diethylene triamine and 9.8 g of ethylenediamine in 505.1 g of desalted water is added to this emulsion with stirring. The quantities of amine used are calculated to be stoichiometric in relation to the quantity of isocyanate. After addition of the amines, 104 g of calcium chloride ($CaCl_2 \cdot 6 H_2O$) dissolved in 200 g of water are added to the suspension with stirring.

The reaction mixture is subsequently heated to 60° C. within 1.5 hours and then stirred at 60° C. for a further 2 hours. No evolution of $CO_2$ could be detected during this after-treatment and the suspension remained completely free from foam.

EXAMPLE 2

The procedure was the same as in Example 1 except that, after addition of the amines, 35.15 g of a slurry of calcium hydroxide in 200 g of water were added instead of calcium chloride.

EXAMPLE 3

The procedure was the same as in Example 1, except that 95 g of a 30% silica sol in water were added to the suspension after the addition of amines.

EXAMPLE 4 (COMPARISON EXAMPLE)

The procedure was the same as in Example 1, except that the suspension was heated and thermally after-treated immediately after the addition of amines, without the addition of any additive. 1.3 Liters of carbon dioxide evolved during the after-treatment and the slurry foamed vigorously. Spray drying of the slurries The capsule suspension prepared according to Examples 1–4 were dried in a commercial spray drier ("Niro Atomizer", made by the Niro Company of Denmark). The substances were introduced through a two-material nozzle; the air temperature at the inlet was 200° C. and the outlet temperature was 90° C. Suspension was passed through the apparatus at the rate of about 3 liters per hour. The following results were obtained under these conditions:

| Suspension | Quantity (g) Deposit in drying tower | in receiver | Nature of dried suspension |
| --- | --- | --- | --- |
| Example 1 | 210 g | 670 g | very slight formation of agglomerates |
| Example 2 | 260 g | 700 g | very slight formation of agglomerates |
| Example 3 | 150 g | 810 g | free from agglomerate |
| Example 4 | 680 g | 285 g | severely agglomerated, not redispersible |

We claim:

1. The process for production of dry, free-flowing microcapsules having a core material encapsulated by a polyurea wall formed by interface polyaddition of a polyisocyanate and a polyamine, said process comprising:
   (a) emulsifying the core material to be encapsulated and the polyisocyanate with an aqueous solution,
   (b) adding to the emulsion the polyamine and from 1 to 10 parts by weight, based on microcapsules to be formed, of a water-soluble silicate, a water-soluble alkaline earth metal salt, a water-soluble alkaline earth metal hydroxide or mixtures thereof,
   (c) polycondensing the polyisocyanate with the polyamine while maintaining the emulsion to produce microcapsules with polyurea walls,
   (d) simultaneously and in situ forming an insoluble alkaline earth metal carbonate salt or an insoluble polysilicate from the corresponding water-soluble alkaline earth metal salt and hydroxide or silicate whereby an aqueous suspension of microcapsules is formed, and
   (e) spray drying said aqueous suspension.

2. The process according to claim 1 which comprises in step (b) adding to the emulsion the polyamine and from 1 to 10 parts by weight, based on microcapsules to be formed, of at least one of calcium chloride or calcium hydroxide.

3. The process according to claim 1 which comprises in step (b) adding to the emulsion the polyamine and from 1 to 10 parts by weight, based on microcapsules to be formed, of sodium silicate.

4. The process according to claim 1 wherein said core material comprises a color-forming agent selected from the classes of triphenyl methane compounds, diphenylmethane compounds, xanthene compounds, thiazine compounds and spiropyrane compounds.

5. The process according to claim 1 wherein said microcapsules are from 1 to 2000 $\mu$m and have a weight proportion of core material: polyurea wall of from 50:90 to 50:10.

6. The process according to claim 1 wherein the polyisocyanate and polyamine are provided in about stoichiometric amounts.

7. The process according to claim 1 wherein said emulsion is stabilized by protective colloids or emulsifying agents.

8. The process according to claim 1 wherein the quantity of said salt or hydroxide mixed in (b) is calculated so that the carbon dioxide produced in the polyisocyanate-polyamine condensation is reacted with said salt or hydroxide to produce the corresponding carbonate.

9. The process according to claim 1 wherein the polycondensation is at about 60° C.

10. The process according to claim 1 wherein benzoyl leucomethylene blue and crystal violet lactone are encapsulated in polyurea by
   (a) emulsifying a solution containing benzoyl leucomethylene blue, crystal violet lactone and oxadiazine trione diisocyanate in an aqueous solution to a droplet size of about 10 $\mu$m,
   (b) adding to the emulsion an amine mixture containing diethylene triamine and ethylene diamine along with an aqueous solution of calcium chloride,
   (c) polycondensing the reactants in the emulsion to produce microcapsules,
   (d) simultaneously and in situ forming calcium carbonate during the polycondensation, and
   (e) spray drying said aqueous suspension.

* * * * *